United States Patent [19]

Brezny

[11] 4,196,894
[45] Apr. 8, 1980

[54] BASIC OXYGEN FURNACE AND REFRACTORIES THEREFOR HAVING IMPROVED THERMAL CONDUCTIVITY

[75] Inventor: Bohus Brezny, Middletown, Ohio

[73] Assignee: Armco Inc., Middletown, Ohio

[21] Appl. No.: 879,478

[22] Filed: Feb. 21, 1978

Related U.S. Application Data

[63] Continuation-in-part of Ser. No. 794,710, May 9, 1977, abandoned.

[51] Int. Cl.$^2$ .............................................. C21C 5/44
[52] U.S. Cl. ................................. 266/282; 110/338; 266/283
[58] Field of Search ................ 266/282, 283; 110/1 B, 110/1 C

[56] References Cited

U.S. PATENT DOCUMENTS

| 122,908 | 1/1872 | Perry | 266/282 |
|---|---|---|---|
| 2,527,063 | 10/1950 | Heuer | 110/1 B |
| 2,652,793 | 9/1953 | Heuer et al. | 110/1 B |
| 2,759,723 | 8/1956 | Crespi | 266/283 |
| 2,791,116 | 5/1957 | Heuer et al. | 266/282 |
| 3,615,776 | 10/1971 | Farrington | 106/59 |
| 3,832,478 | 8/1974 | Books | 266/282 |
| 3,852,080 | 12/1974 | Davies et al. | 106/58 |

FOREIGN PATENT DOCUMENTS 49-45776 12/1974 Japan ..................... 266/282

Primary Examiner—Paul A. Bell

Attorney, Agent, or Firm—Frost & Jacobs

[57] ABSTRACT

A steel refining furnace and refractories therefor having improved thermal conductivity may be achieved by the use of refractory bricks containing 3½ to 5½% residual carbon and having metal plates and the like associated therewith externally and, in many instances, internally. The cold face of the brick should be protected by a metal shell. Such a brick will have high thermal conductivity to achieve a cooler hot face of the basic oxygen furnace lining whereby to improve and decrease the rate of slag erosion in the furnace and to improve the thermal shock resistance of the refractory lining. An improved furnace is realized by utilizing the novel brick in specific areas thereof such as under the lip ring and in the trunion areas. Preferably the brick itself will be a pitch bonded magnesia refractory having an internal and external metal casing (chemically bonded by combining the refractory grains with prescribed amounts of coal tar pitch, carbon and/or grahite, tempering the mixture, pressing it into bricks while adding the metal elements, and drying them), or an external metal casing of burned pitch impregnated refractory (direct bonded by molding and firing, at high temperatures on the order of 3000° F., 1650° C., whereafter the bricks are impregnated with carbon in some form and the metal elements are added). The metal elements must be prevented from oxidation, thus the requirement for the presence of residual carbon in the brick and the use of a metal shell to shield the cold face thereof from oxygen penetration.

28 Claims, 9 Drawing Figures

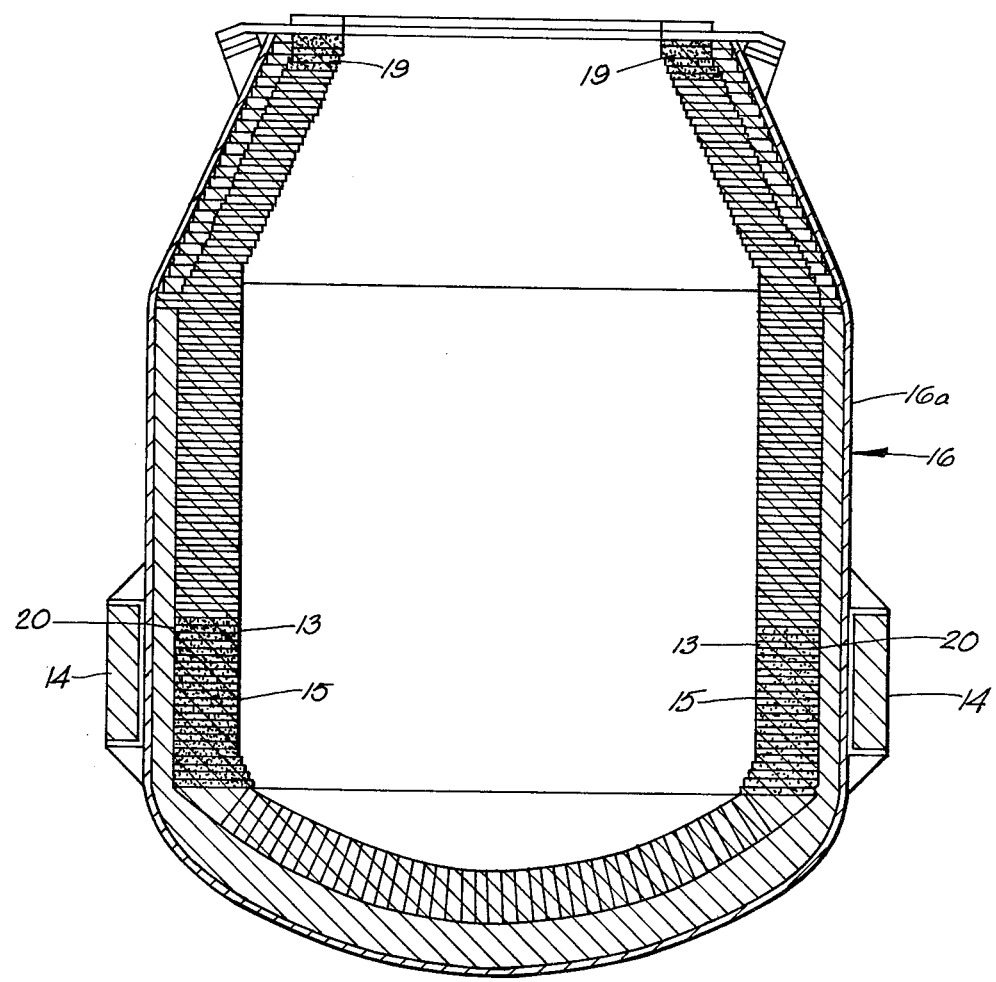
_FIG. 1_
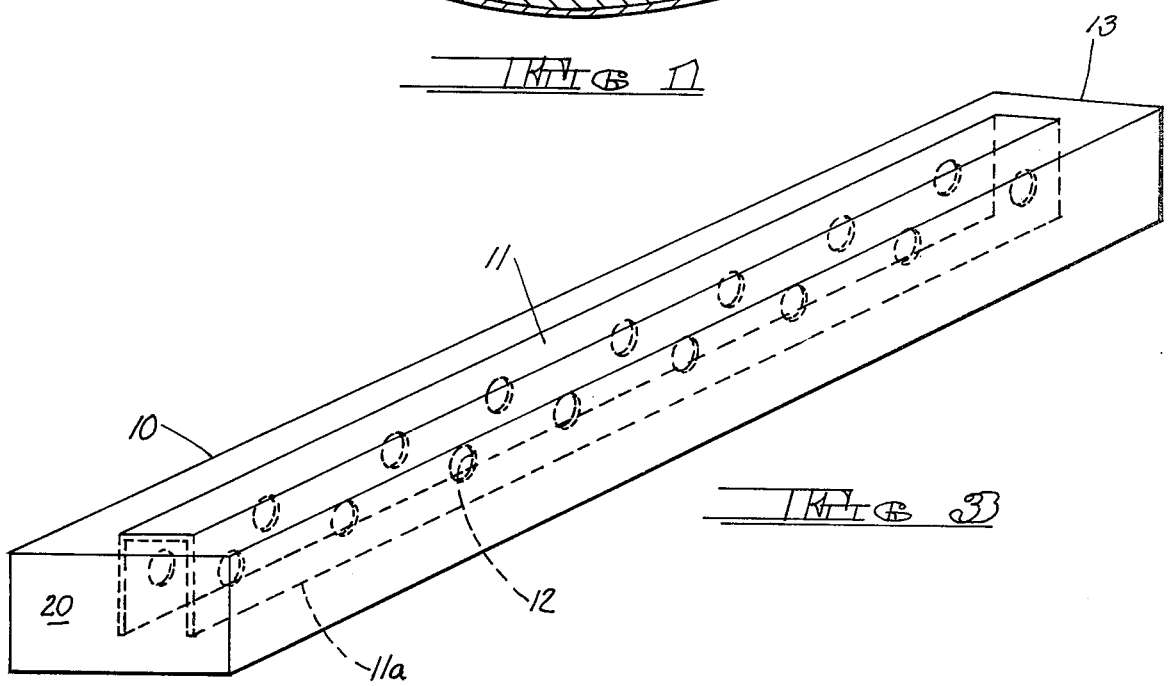
_FIG. 3_

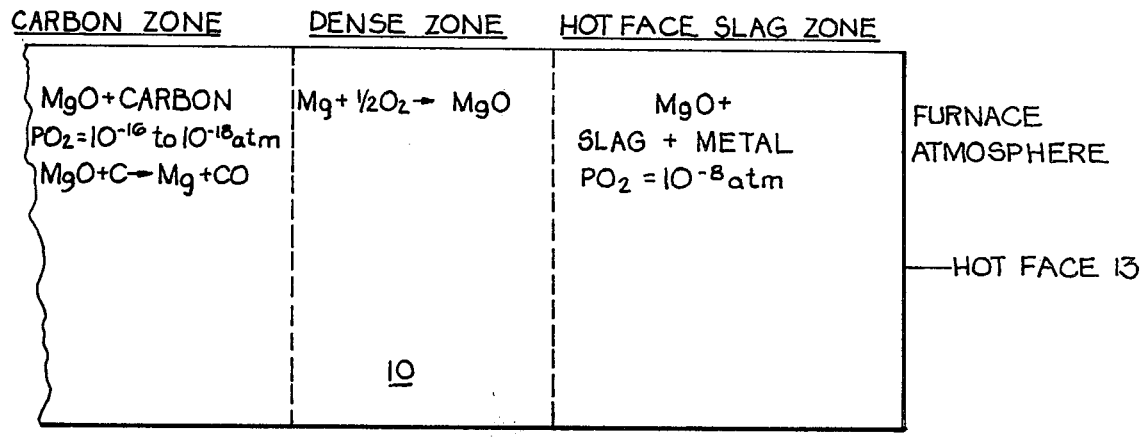

BASIC OXYGEN FURNACE AND REFRACTORIES THEREFOR HAVING IMPROVED THERMAL CONDUCTIVITY

CROSS REFERENCE TO RELATED APPLICATION

This is a continutaion-in-part application of U.S. patent application Ser. No. 794,710 filed May 9, 1977, now abandoned, in the name of the same inventor for Basic Oxygen Furnace and Refractories Therefor Having Improved Thermal Conductivity.

BACKGROUND OF THE INVENTION

1. Field of the Invention

This invention relates principally to basic oxygen furnaces (BOF) and chemically pitch bonded refractory brick; as noted herein, however, there may be exceptions and the invention is not to be limited to BOF nor to chemically bonded brick. In such furnaces (BOF) temperatures can be as high as 3100° F. (1700° C.). It is important that the atmosphere inside the furnace lining, i.e., within the brick comprising the lining, be reducing and, therefore, the invention is not designed for use for and in, for example, open hearth furnaces. This is because the carbon in the improved brick of this invention would not readily prevent oxidation of the metal elements in an open hearth furnace (there would be too much oxygen present) but it does prevent oxidation of such elements in a basic oxygen furnace wherein there is an absence of any substantial source of oxygen within the brick comprising the furnace lining. More specifically, therefore, the invention is directly associated with the making of steel. Those furnaces, or portions thereof, which are shielded to an external metal shell at the cold face may utilize the improved brick of this invention.

2. Description of the Prior Art

A state-of-the-art patent search concerning this invention developed the following U.S. Pat. Nos. 122,908-Perry, 1,672,524-Groninger, 2,216,813-Goldschmidt, 2,652,793-Heuer, et al., 2,764,887-D'Ambly, and 2,853,852-Samuel. The following foreign patents were also developed: Nos. 890,893-British, 575,857-Canada and 1,471,111-German. No assertion is made, however, that the foregoing patents represent the closest art although it was indeed the intent of the search to develop such art.

With reference to the patents noted above, the British, Canadian, and Heuer, et al patents all disclose brick having metal ribs or reinforcements. Apparently the primary reason for such reinforcements is to provide an anchor or suspension means for the brick within the furnace and to reduce the incidence of spalling from the hot face. No disclosure is made in these patents, however, as to whether or not improved thermal conductivity could be realized by the use of metal ribs if they were in a reducing (non-oxidizing) environment. Apparently these patentees believed that their ribs would oxidize near the hot face and thus subsequently become a part of the refractory, that is, a monolithic refractory would result. Although the remaining patents teach metal encasement and reinforcement and the like, and are therefore of general interest, they do not teach or suggest the furnace and refractory taught herein.

The Heuer, et al patent does discuss the problems in brick which are associated with hot and cold faces; namely, transverse cracks which lead to pieces spalling from the hot face of the brick. This is representative of that well known fact in this art that the thermal gradient which exists between a hot face and a cold face of a brick will result in a very high stress build-up which can and does result in cracking. Specifically, however, the Heuer, et al teachings are applicable to suspended roof brick to be used in an open hearth furnace. Thus, while Heuer, et al do speak of metal plates embedded in refractory brick, and even of adding sulphite pitch to the refractory material, Heuer, et al also speak of the metallic member being oxidizable, a phenomenon which is carefully eliminated in the instant invention.

The Samuel patent discloses a metal cased refractory brick. This is for the purpose of increasing strength. The strengthening principle of Samuel, however, is the same as that taught by Heuer, et al in that the plates are oxidized to iron oxide which fuses into the refractory to result in a monolithic layer, again, a phenomenon which the instant invention carefully avoids.

Reference is also made to British Pat. No. 1,031,584 which, while not developed by the state-of-the-art search, appears to be pertinent. This patent relates to a magnesia brick intended for lining converters, such as BOF, but to a brick which quite specifically is "free of external plates". The patent summarizes its teachings at lines 54 through 62 of column 2 of page 2 as follows. "It has been found that this object can be accomplished by making the lining from refractory, basic or neutral brick, particularly magnesia bricks, which are free of external plates and characterized by the combination of the features known per se that they contain tar only as a binder rather than in the form of an impregnation and comprise co-moulded internal plates."

Another patent which has come to light is British Pat. No. 1,368,635 which is of interest for its disclosure of a cold-bound carbon-containing basic refractory brick incorporating graphite therein.

Additionally there are other patents known to be relevant to chemically bonded brick, and to direct bonded brick, generally: Representative U.S. patents disclosing chemically bonded brick are Woodhouse, et al. No. 3,475,188; Davis, et al. No. 3,479,194; and Farrington, et al. No. 3,615,776. U.S. patents disclosing direct bonded brick are Wright No. 3,715,223; Farrington, et al. No. 3,829,541; Davis No. 3,852,080; and Farrington, et al. No. 3,864,136.

Reference is also made to the following publications: "Transactions and Journal of the British Ceramic Society", Vol. 71, No. 6, pp. 163–170 September, 1972; "Journal of the American Ceramic Society", Vol. 56, No. 11 November 1973, pp. 611 and 612; "American Ceramic Society Bulletin", Vo. 55, No. 7 July 1976, pp. 649–654; and "Journal of the American Ceramic Society", Vol. 59, No. 11–12, November–December, 1976, pp. 529 and 530. These articles discuss and explain the vaporization of Mg from MgO within, but near the hot face of, the brick to form a dense zone between the carbon-containing part and the hot face of the brick.

SUMMARY OF THE INVENTION

The refractories of this invention, which are particularly well suited for use in at least certain areas of a basic oxygen furnace, are comprised at least in part of chemically pitch bonded refractory brick in which metal elements are placed in situ externally and internally. Refractory is a poor conductor (good insulator) of heat while metal (the steel elements, for example) is a good conductor of heat. By embedding metal elements (strips, plates and/or rods, for example) parallel to the longitudinal axis of the brick, heat can be transferred from the front (hot face) to the back (cold face) of the brick. During the operation of the furnace, the hot face of the brick can approach or exceed about 3000° F. (1650° C.). Erosion of the refractory, and deterioration of the furnace lining, can be drastically reduced by lowering the hot face temperature a few hundred degrees and this is accomplished by the use of the metal elements.

Most metals, however, are subject to rapid oxidation in the presence of an oxidizing atmosphere at furnace operating temperatures. It is necessary, therefore, to provide means within the brick to prevent the metal elements from oxidizing. If the metal were allowed to oxidize, it would react with the brick to form one monolithic unit. In the instant development, this is prevented by combining coal tar pitch and/or carbon with the raw refractory material prior to forming the bricks, particularly chemically, pitch bonded bricks. The metal elements may be of low carbon steel or any other metal of sufficiently high melting point.

As has been indicated herein, the preferred embodiment for this invention is for chemically, pitch bonded brick, although it may be applied to burned (direct bonded) bricks as will be amplified later herein. Respecting pitch bonded brick, the refractory grains are combined with the prescribed amounts of pitch, carbon and/or graphite and this refractory mixture is placed into a mold. The metal elements, whether they be plates or rods, may be both externally and internally combined in situ with this mixture. One way of doing this is to provide the press or ram used to compress the refractory shape with a magnet on its surface. The purpose of the magnet is to hold the metal plate or rod in order for it to be pressed into or about the refractory shape. The mixture may be first tempered and the pressed bricks, with the metal elements having been properly placed, then dried. These new bricks are now ready to be placed into service.

It should again be noted, however, that the invention may, under certain conditions, be utilized with burned pitch impregnated magnesia. Prior to the pressing of these bricks into the desired shape, pitch, carbon and the like are not added to the refractory mixture. The reason for this is that after the bricks have been shaped, they are fired at very high temperatures, in the neighborhood of 3000° F., to insure the direct bonding of the refractory grains to each other. This is normally done in an oxidizing atmosphere. In the presence of oxygen, all the carbon would be depleted from the bricks during this firing.

After the fired bricks have cooled, they are processed through vacuum impregnators which deposit the pitch. This is what is referred to herein as the "burned pitch impregnated magnesia".

The present development may be used for magnesia, doloma, and magnesio-doloma type pitch bonded refractories; alumina and alumina-silica type refractories may also be included and, perhaps, chrome and chrome-magnesia bricks as well. Very broadly, the present invention can be used for any refractory system which would not be reduced by the carbon, and at the same time so depleted of carbon, at service temperatures, as to leave the metal elements unprotected. A difficulty with chrome refractories, for example, is that at service temperatures the iron oxide present in such chrome type refractories, and the chrome oxide, are reduced by the carbon in the brick to pure iron on chromium. Once the carbon has been depleted, the metal elements are free to become oxidized and defused with the refractory as previously indicated, thereby disrupting the thermal conducitive properties of the new brick.

In addition to lower slag erosion, the present invention lowers the tendency for the brick to form thermal cracks and thus reduces spalling. There is a steep, non-linear temperature gradient between the hot and cold faces of a brick when in service. The hot face, for example may be 3000° F. (1650° C.) while the cold face may be as low as 500° F. (260° C.). Since the coefficient of expansion is a function of temperature, it will be obvious that very high stresses can be set up in the brick for the hot portion thereof is expanding at a different rate than the cold portion. Maintaining the metal elements in tact in the brick reduces the temperature gradient and makes it more linear. This results in reduced spalling.

The blend of 94% magnesia, 4% pitch and 2% carbon is apparently the optimum blend for compressibility when making the brick. It has been determined that about 4% of residual carbon is optimum and this is the amount of residual carbon which results from the blend just described. For chemically, pitch bonded brick, therefore, part of this carbon can be added as liquid coal tar pitch whereby the pitch acts as the binder. Other binders, such as magnesium sulfate, magnesium chloride, calcium nitrate, lignosulfonates, and fume silica may be used in place of pitch. Sucn other binders, however, must be used in a reducing environment to prevent the oxidization of the metal element; this may be achieved, for example, by the addition of sufficient amounts of fine carbon and/or fine graphite to the mix.

The 4% pitch yields about 2% carbon after it is volatized. Using less than about 4% pitch (in a chemically, pitch bonded brick) results in a brick having poorer bonding while using more than about 5% pitch in such a brick is detrimental to the compressibility thereof. Furthermore, residual carbon in an amount in excess of 5½% introduces more porosity, i.e., more and bigger holes, thus making it too easy for slag and oxygen to penetrate the hot face of the brick. It is believed, therefore, that the broad ranges for the pitch and carbon are, respectively, when both are used, 3–5% and 2–3%. The preferred refractory system is MgO in the range about 90+%. Preferably, however, it appears that there should be a minimum of residual carbon, whatever the source, of about 3½%, 4% being considered optimum. Thus, the percentages just noted define a range for residual carbon of from 3½ to 5½%, 4% being preferred. (When pitch is not used, and if a binder is used which does not have or release carbon, the range of carbon is, of course, the same as that of the range of the residual carbon desired, namely, 3½ to 5½%.)

Pitch bonded brick presently used (that is, prior to the instant invention) in BOF vessels are tempered for several hours at temperatures between 350° F. (180° C.) to 750° F. (400° C.) in continuously operating tempering oven. The tempering is required to improve the strength and spalling resistance of pitch bonded brick at intermediate temperatures. This strength is important mainly for safe burn-in of a new BOF lining.

The new metal plated pitch bonded brick according to this invention do not require tempering. Metal plates give mechanical strength at intermediate temperatures which prevent spalling and slumping during burn-in.

An important feature of the preferred embodiment of this invention, the use of metal plated pitch bonded brick, is the substantial energy saving realized by eliminating the tempering step.

BRIEF DESCRIPTION OF THE DRAWINGS

FIG. 1 is a front view, partly in section and partly diagramatic, depicting a basic oxygen furnace incorporating the invention and illustrating where the improved refractory brick may be located.

FIG. 3 is a perspective view of one form of the chemically, pitch bonded magnesite brick of this invention with internal steel plates.

FIG. 9 is a diagramatic representation of a small portion, less than three inches (80 mm), of the activity which takes place near the hot face of the brick.

DESCRIPTION OF THE PREFERRED EMBODIMENTS

Figure 2:
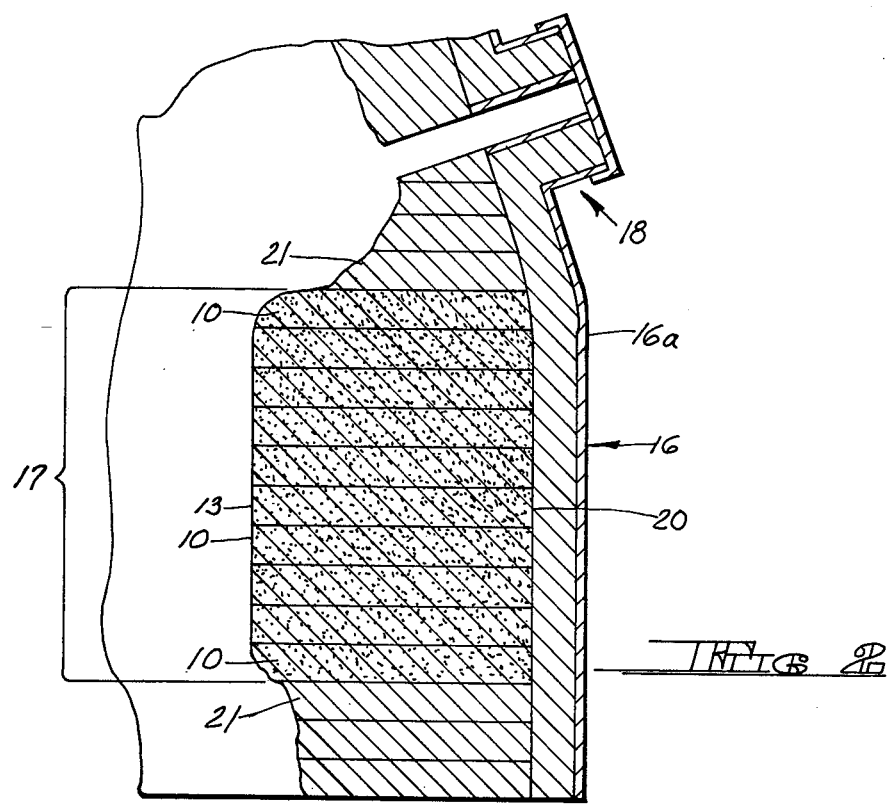
FIG. 2 is a fragmentary sectional view of that portion of a basic oxygen furnace wherein the brick is located and depicting the improved resistance to slag erosiion achieved in the furnace by the use of the improved refractory brick.

Referring first to FIG. 3, one form of that facet of the invention which resides in the improved refractory brick itself is shown. The pitch bonded magnesia brick is indicated at 10. The inverted U-shaped metal plate 11 is incorporated is situ with the chemically bonded refractory brick 10. Preferably the brick contains 90% or more MgO. A quite satisfactory composition has been found to be 94% magnesia, 4% liquid pitch and 2% carbon. Preferably the legs 11a of the U-shaped plate 11 are provided with holes 12 to aid in binding the plate 11 in the brick 10. The hot face is indicated at 13. The top of the inverted U-shaped metal plate 11 will be exposed. In a furnace, however, such exposed metal will in fact be protected by the refractory brick placed thereon. In a typical configuration the length of the brick 10 may be 27 inches (680 mm), its width 6-5 inches (150-130 mm) (tapered), and its height 3 inches (80 mm).

The metal plate 11 will not oxidize because it will be in contact with the pitch and carbon incorporated in the magnesia refractory. When properly positioned, for example, in a basic oxygen furnace, the relative cooling of the hot face, achieved by incorporation of the metal element 11 within the brick 10, will slow down the rate of slag erosion and the thermal spalling of the furance wall.

An improved basic oxygen furnace (BOF) is illustrated in FIG. 1. (It should be understood, however, as will be apparent to those skilled in the art, that the principles of this invention may be applied to other vessels such as an AOD furnace, a vacuum degassing vessel, or some areas of an electric furnace). The improved brick, for example that of FIG. 3, is incorporated in the speckled areas indicated on FIG. 1. Two of these areas are the panels 15 adjacent each of the trunions 14 of the basic oxygen furnace 16. By way of example the panels comprised of the improved brick 10 may contain 660 brick, 20 courses high and 33 brick wide.

Another area for incorporation of a panel comprised of the improved brick 10 is indicated at 17 under the tap hole 18. Such a panel of improved brick 10 may consist, for example, of 120 brick, 10 courses high and 12 brick wide.

A further area in which panels of the improved brick 10 may be incorporated is under the lip ring. It is believed that the brick 10 of FIG. 3, for example, having higher thermal conductivity will make deskulling easier. Such use is indicated at 19 in FIG. 1.

In all vessels for which use of the improved brick of this invention is contemplated, namely, vessels wherein the cold face, or portions thereof, is protected from air, such as by the metal jacket 16a on the outside of the vessel, the refractory lining is protected from undue oxidation, at and near the hot face 13, both from within and without. The atmosphere near the refractory lining inside the vessel (hot face 13), at times at least, oxidizing. Steps must be taken, therefore, to protect this hot face. The cold face 20 (see FIGS. 1 and 3), as noted above, is protected from air by the metal jacket 16a on the outside of the vessel.

In most vessels, including a BOF, there are times when the atmosphere within the vessel, and more particularly immediately adjacent the hot face, is oxidizing, at least to the Mg (gas) coming from within the brick, as will be described more fully shortly, even though such atmosphere may generally be considered reducing. This is because there are times when oxygen has access to the furnace interior. An empty furnace, for example, is full of air; this condition, of course, also prevails between heats. Scrap usually has rust thereon. During blowing, such as by oxygen injection into the molten bath, slag will slop up the interior side walls, and slag contains several sources of oxygen including that absorbed from the air and from the bath, and including also CaO, FeO and MnO by way of examples only. The slag which slops up the interior side walls of the furnace will place the brick it thus contacts into an oxidizing situation regardless of in what condition the atmosphere within the furnace may be.

The brick of this invention has oxygen and carbon therein when made; such brick, therefore, will lose some carbon just in getting rid of entrapped oxygen (from, e.g., the air in the brick and binder). In addition to such residual oxygen, however, acted upon by the carbon, there is a reducing effect which takes place between the MgO and carbon; this latter effect causes vaporization and subsequent precipitation of Mg (gas), some of which at least will migrate towards the hot face and diffuse therefrom. In the region of the hot face such Mg will react with the oxygen there present, as for example in the slag, whereby to reform and precipitate as MgO, thereby creating a dense barrier which resists further slag penetration and physical wear. This phenomenon, which is also diagramatically illustrated in FIG. 9, is taken into consideration in the formulation of the metal-in-brick of this invention.

Several authors have described the foregoing phenomenon, the formation of a dense magnesia zone just behind the hot face of BOF brick, see for example the four articles previously identified. It is believed that this zone which is formed between the slag contaminated hot face and the carbon containing brick, formulated as taught herein, prevents the oxygen and slag from penetrating too extensively into the refractory body, the other objects of the invention alos being realized by such formulation.

Formation of the dense zone may take place under two conditions, reference also being directed to FIG. 9 which represents a section of brick 10 extending from the hot face 13 a distance of something less than one-half inch:

One. In one part of the system a partial pressure of oxygen is low enough to reduce and vaporize MgO. This is accomplished by the presence of carbon in the pitch bonded magensia refractory—(carbon zone); and Two. In other parts of the system, the partial pressure of oxygen is high enough to oxidize and condense the reduced species (Mg) from the gas phase back to the oxide (MgO)—(hot face slag zone).

These two basic conditions are present at the working face (hot face) of a brick in a BOF. The hot face provides oxygen (from the oxide phases in the slag and at times from the furnace atmosphere) high enough to oxidize and stabilize the reduced species which diffuses from that part of the brick containing carbon. This is another factor taken into consideration in the formulation of the brick of this invention.

EXAMPLE I

Referring now particularly to FIG. 2, an experiment with the invention will be described. A panel of externally and internally plated brick was installed in a basic oxygen furnace 16. The panel was comprised of 120 pieces of $27 \times (6-5) \times 3$ inch keys ($680 \times (150-130) \times 80$ mm). The metal element 11 was incorporated in situ in the chemically, pitch bonded refractory brick 10, which brick was formulated in accordance with the preferred blend of 94% magnesia, 4% pitch, and 2% carbon. The panel was located 4 courses below the tap hole 18, 10 courses high and 12 bricks wide.

The vessel was then burned-in. After the intiial burn-in, the experimental panel comprised of the improved brick 10 was darker than the rest of the lining (made up of ordinary brick having no metal elements incorporated therein) indicating about a 100° F. (about 50° C.) lower hot face temperature on the experimental panel than on the rest of the lining. The panel was observed the next day and was visibly extending approximately 1 inch (25 mm).

The furnace came down after approximately 625 heats with holes in the trunions and lower charge pad area. The panel of experimental brick 10 extended approximately 3 inches (75 mm) relative to the surrounding lining. This is depicted in FIG. 2.

More specifically with reference to this Example, of the original 27 inches (680 mm) of length, the new brick 10 still had about 11 to 12 inches (280-300 mm) remaining. The regular brick 21 immediately above and below the panel of new brick 10 had about 8 and 9 inches (200 and 230 mm) respectively remaining. This indicates about an 11% increase in life may be expected for the new brick 10 over the regular brick 21 (such regular brick not having the metal elements of this invention).

EXAMPLE II

Another experimental campaign was conducted in a basic oxygen furnace. The lining, except for a section adjacent the west trunion, was composed of regular brick, specifically refractories as follows: 90% MgO pitch bonded barrel; burned pitch impregnated magnesia charge pad; and 96% MgO pitch bonded magnesia east trunion. The panel of experimental brick 10 was incorporated in the lining adjacent the west trunion. The brick 10 were like those described and used in EXAMPLE I.

The furnace was burnt-in and the panel of improved brick 10 was observed several times during the campaign. The most significant difference observed during the campaign was the appearance of the hot face. The experimental panel of improved brick 10 always had a rough appearance because of slag attached to the panel. The relatively hotter face of the panel adjacent the east trunion was always smooth with no slag attached and the joints between the regular brick of which it was comprised were always visible. The shell temperature in the trunion area was checked using a thermovision camera.

After 250 heats on the lining, the temperatures were: experimental trunion panel of improved brick 10 465° F. (240° C.): and regular trunion of regular brick 21 450° F. (233° C.).

After 300 heats, both trunions were measured by radiation thermometer KT 11 and the following temperatures were observed: experimental trunion of improved brick 10 520° F. (271° C.); and regular trunion of regular brick 21 510° F. (266° C.).

After these 300 heats the regular bricks 21 were dished out 2 to 3 inches (50 to 80 mm) deep. The experimental trunion extended about 1 to 2 inches (25 to 50 mm). The difference between the two panels were judged to be about 4 inches (100 mm) in favor of the experimental brick 10.

After 500 heats, the temperatures were: experimental trunion of improved brick 10 450° F. (230° C.); and regular trunion of regular brick 21 550° F. (288° C.).

This temperature difference can be explained only by the thickness of the lining. Although the experimental bricks have higher thermal conductivity, the shell behind them is cooler because of more brick thickness remaining in the lining.

After 550 heats the temperatures were: experimental trunion of improved brick 10 550° F. (260° C.); and regular trunion of regular brick 21 560° F. (293° C.).

The first hole developed in the regular trunion comprised of regular brick 21 after approximately 590 heats. The furnace came down with 660 heats on the lining becuase of the hole in the trunion panel comprised of regular brick 21. The experimental panel of improved brick 10 including the internally plated brick was comprised of 600 bricks.

From the foregoing it will be observed that the temperatures taken after 250 and 300 heats showed the experimental brick 10 cold face to be 15° F. and 10° F. hotter respectively than that of the regular brick 21. This is expected because of the increased conductivity of the brick 10 having the metal plates therein. After 500 and 550 heats the cold face of the experimental brick was 100° F. (38° C.) and 60° F. (13° C.) cooler respectively than the regular brick 21. This temperature reversal is explained by the fact that the regular brick lining 21 had become considerably thinner than the experimental brick lining 10. As indicated, the regular lining was burned completely through after 590 heats. At that time the experimental lining of improved brick 10 under the west trunion still had about 7 to 8 inches (180 to 200 mm) remaining of the original 27 inches (680 mm). This is about a 25% improvement in lining life.

FURTHER DESCRIPTION OF THE INVENTION

Figure 4:
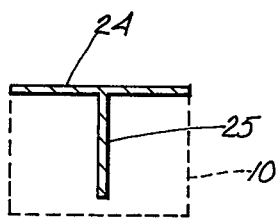
FIGS. 4, 5, 6, 7 and 8 are diagramatic, sectional views taken at right angles to the long axis of the improved brick and illustrating various forms and locations for the metal elements which are incorporated in the improved refractory brick of this invention.
Figure 5:
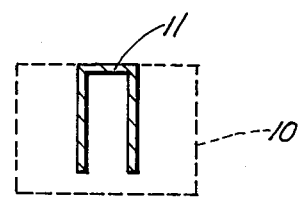

FIGS. 4, 5, 6, 7 and 8 illustrate other configurations which may be given the metal elements which are incorporated into the chemically, pitch bonded brick 10. First, however, it will be observed that the arrangement of FIG. 5 is essentially that of FIG. 3 wherein an inverted U-shaped metal plate 11 is placed in situ with chemically, pitch bonded refractory brick 10 having the formulations given herein.

Figure 7:
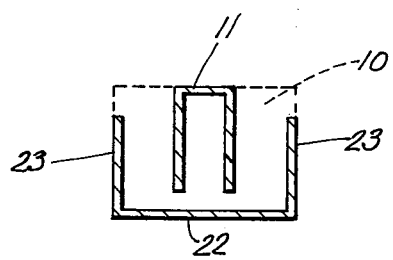

The arrangements of FIG. 7 incorporates another and wider U-shaped metal plate member 22 extending across the bottom of the brick and having legs extending upwardly at the sides thereof.

Figure 6:
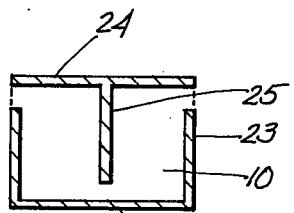

The arrangement of FIG. 6 also incorporates the U-shaped member 22, 23 but the inverted U-shaped member 11 has been replaced by a T-shaped member 24 having the leg 25 thereof extending short of the member 22 and parallel to the legs 23.

In the arrangement of FIG. 4 the U-shaped member 22, 23 has been eliminated and only the T-shaped member 24, 25 has been incorporated with the brick 10.

Figure 8:
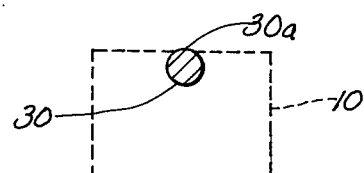

In the arrangement of FIG. 8 the metal element comprises a rod 30 extending parallel to the long axis of the brick 10 and having the top 30a thereof exposed externally.

The arrangements of FIGS. 4 through 8 appear to be the preferred arrangements. Note that these arrangements include internal plates as well as external ones. It is conceivable that the internal plates as shown in FIGS. 5 and 7, for example, could be of various shapes such as a single rib (FIG. 6), multiple rib (FIG. 5), C-shaped, serpentine and the like. Any section of the plates internal to the brick 10 should have holes (like those indicated at 12 in U-shaped plate 11 of FIG. 3) so good bonding can result between the refractory grains. When the bricks are compressed there should be a continuous bond throughout the brick. If the holes were not present, the brick would really be divided into three cells.

In EXAMPLE II above, these were the shell temperatures, that is, the temperatures existing at the cold face of the furnace. No indication of the specific amount of temperature reduction at the hot face was given because it was unavailable in that the difference could not be precisely measured. Judging from differences in color, however, it appears that the hot face of the improved brick 10 must have been at least 100° F. (38° C.) cooler than the hot face of the regular brick 21. Furthermore, the observation after 130 heats showed the panel of improved brick 10 to have slag sticking to it, thus indicating that there was a marked difference of temperature, that of the hot face of the improved brick 10 being cooler than that of the hot face of the regular brick 21. Additionally, in the laboratory, when firing a furnace to produce a hot face temperature of 815° F. (435° C.) for regular brick 21, the temperature simultaneously resulting in the hot face of the experimental brick 10 was 625° F. (330° C.). It would appear, therefore, that the improved brick 10 will have a hot face in the neighborhood of 200° F. (95° C.) cooler than the hot face of regular brick 21.

In addition to the demonstrated fact that the metal elements of the improved brick 10 keep the hot face of such brick cooler, it has also been determined that these metal elements reduce the rate at which the hot face loses heat during cool down of the furnace. This effect is important between heats in a refining furnace. After the furnace has been tapped and during recharging, cooling of the brick occurs. Large differentials of fluctuations in temperature set up very high stress conditions which lead to cracking of the brick. By reducing the rate of heat loss, however, the metal elements of the improved brick 10 of the instant invention tend to reduce this problem.

With further reference to brick cracking, particularly that which results from a very large temperature gradient between the hot and cold faces of a brick when in service, note that the improved brick 10 of this invention will reduce such cracking and spalling by reason of the fact that the incorporated metal elements will reduce such difference in temperature graident by leading heat from the hot face toward the cold face. Thus, since the coefficient of expansion is a function of temperature, very high stresses can be set up in the brick particularly when one portion of a brick in expanding at a different rate than the other. By reducing this difference, the streses are more equal and the total effect on the brick is lessened.

REVIEW

By way of review, the primary refractory system is preferably one which includes MgO in the range of about 90% or more. It is preferred that pitch be incorporated in the refractory material in the range of 3 to 5%. Carbon should also be used, preferably in the range of 2 to 3% when both pitch and carbon are used, and in the range of $3\frac{1}{2}$ to $5\frac{1}{2}$% when pitch is not used. The blend of 94% magnesia, 4% pitch and 2% carbon has been found to be the optimum blend, particularly for compressibility when making the brick. It appears that about 4% residual carbon is optimum but, as indicated, this may at least be in part added as liquid pitch whereby the pitch acts as the binder. It also appears that there should be a minimum of $3\frac{1}{2}$% residual carbon.

As has been noted, the preferred formulation of the refractory of this invention not only includes an organic binder such as pitch to both aid compressability and supply some residual carbon, but it also includes additional residual carbon, added as fine carbon or graphite to the brick mix. It is believed that this total amount ($3\frac{1}{2}$ to $5\frac{1}{2}$%) of residual carbon, 2 to 3% of which may be added as fine carbon or fine graphite when pitch or other organic binder capable of supplying residual carbon is used, the binder being such as to supply $1\frac{1}{2}$ to $2\frac{1}{2}$% of the residual carbon, is necessary for the following reasons:

One. It prevents the metal elements from being oxidized. This is important for otherwise such elements would react with the oxygen in the brick to form one monolithic unit which would destroy the high thermal conductivity required to achieve the markedly cooler hot face and the attendant advantages thereof, all of which constitute the objects of this invention;

Two. The range of $3\frac{1}{2}$ to $5\frac{1}{2}$% residual carbon, particularly when some of this is supplied by an organic binder such as pitch, improves the pressing characteristic, and consequently the density and porosity, of a brick;

Three. It further enhances the thermal conductivity of internally plated pitch bonded brick; and Four. It improves the quality and rate of formation of dense MgO zones which slow down the oxidation of the carbon and of the metal elements in a brick, and successive formations of such dense zones consequently slow down slag penetration and physical wear rate of a refractory lining responding to the instant invention.

It will be apparent to those skilled in the art that modifications may be made in this invention without departing from the scope and spirit thereof. Broadly speaking, in addition to incorporating metal elements in situ in the chemically bonded brick, any refractory system could be used which would not be oxidizing to the metal elements. Iron oxide can have a detrimental effect on the refractory system and, therefore, it is normally to be avoided. This is because the oxide is reduced by the carbon to form $CO_2$ and Fe, thus depleting the system of carbon. The refractory system of this invention, however, can tolerate small amounts of iron oxide if this is compensated for with additional carbon. Thus, chrome and chrome-magnesia refractories may be used in spite of their high concentrations of $Fe_2O_3$ if care is taken to adequately compensate for the iron oxide. It has been determined that for about each 5% iron oxide present, about 1% carbon will be depleted.

It will be further understood by those skilled in the art that while this invention has been shown and described in connection with particular structures and arrangements, and with respect to particular formulations, the invention is not to be strictly limited to such structures, arrangements and formulations except insofar as they are specifically set forth in the subjoined claims.

With respect to the lipring 19, slag will slop up to it and stick thereon, even blend therewith and, therefore, bond thereto. By using the improved brick of this invention in the lipring area, a cooler hot face is achieved, by reason of which the slag which slops thereon will chill faster, but without bonding to the improved brick, whereby it is easier to remove. This, of course, is the same kind of result achieved by the new brick as applied in the trunion areas 15 of FIG. 1 and at the section 17 of new brick 10 adjacent the taphole 18 of FIG. 2.

Having thus described the invention, what is claimed as new and what is desired to be protected by Letters Patents is:

1. A refractory brick for a steel refining furnace of the type in which the cold face of said brick is shielded from oxygen penetration, said brick being comprised of a refractory material, a metal element as a part of the brick in use extending from adjacent what will be the hot face of the brick to adjacent what will be the cold face of the brick, said refractory material being non-oxidizing to the metal element, and an additional material in the brick in sufficient quantity to prevent oxidization of the metal by oxygen within the brick and by oxygen that penetrates into the brick from the hot face thereof, whereby to improve the thermal conductivity of the brick so as to lower the temperature at the hot face of the brick and to improve the thermal shock resistance of the brick, said additional material comprising residual carbon in the amount of at least 3¼%, the said residual carbon being provided by incorporating in the said refractory material a material selected from a class comprised essentially of pitch, carbon and graphite, said pitch when used not exceeding about 5%.

2. The brick of claim 1 in which said refractory material is comprised of at least 90% MgO.

3. The brick of claim 1 in which the said residual carbon is provided by incorporating in the said refractory material a material selected from a class consisting of carbon and graphite.

4. The brick of claim 3 in which a portion at least of the carbon is in the brick as pitch.

5. The brick of claim 1 in which the formulation thereof is refractory material comprised of at least 90% MgO and the said residual carbon is provided by incorporating in the said refractory material 3 to 5% pitch and 2 to 3% of a class consisting of carbon and graphite.

6. The brick of claim 1 in which the refractory material is 94% magnesia and the said residual carbon is provided by incorporating in the said refractory material 4% pitch and 2% of a class consisting of carbon and graphite.

7. The brick of claim 1 in which the metal element is a plate.

8. The brick of claim 1 in which the metal element is comprised of a plate embedded in the brick and the plate having holes therein through which the refractory material extends.

9. The brick of claim 1 in which the refractory material is substantially free of iron oxide.

10. The brick of claim 1 in which the iron oxide content of the refractory material is 0 to 10%.

11. The brick of claim 1 in which the metal element is a rod.

12. The brick of claim 1 in which the refractory material is chemically, pitch bonded refractory selected from a class consisting of magnesia, doloma, magnesio-doloma, alumina, alumina-silica, chrome and chrome-magnesia, the refractory being non-oxidizing to the metal element.

13. The brick of claim 12 in which the metal element is a rod.

14. The brick of claim 12 in which the metal element is a plate.

15. The brick of claim 12 in which the metal element comprises a plate embedded in the refractory, the plate having holes through which the refractory passes.

16. The brick of claim 15 in which the metal element is a U-shaped plate.

17. The brick of claim 15 in which the metal element is a T-shaped plate.

18. The brick of claim 15 in which the metal element is comprised of a T-shaped plate and U-shaped plate.

19. The brick of claim 15 in which the metal element is comprised of a pair of U-shaped plates.

20. The brick of claim 12 in which the formulation thereof is chemically, pitch bonded refractory in the amount of at least 90% MgO, and the said residual carbon is provided by incorporating in the said refractory material 3 to 5% pitch and 2 to 3% carbon, the iron oxide content of the brick being 0–10%.

21. The brick of claim 1 in which the metal element is a strip.

22. The brick of claim 1 in which the refractory material is direct bonded, burned pitch impregnated refractory selected from a class consisting of magnesia, doloma, magnesia-doloma, alumina, alumina-silica, chrome and chrome-magnesia, the refractory being non-oxidizing to the metal element and the metal element being located externally of the brick.

23. The brick of claim 22 in which said metal element is U-shaped and disposed externally of three sides of said brick.

24. The brick of claim 1 wherein the said refractory material is comprised of a chemically bonded refractory including a binder selected from a class consisting of magnesium sulfate, magnesium chloride, calcium nitrate, lignosulfonates, and fume silica, and wherein the said residual carbon is provided by incorporating in the said refractory material a material selected from a class consisting of fine carbon and graphite.

25. The brick of claim 1 in which the said residual carbon is present in the brick in the amount of from 3¼% to 5¼%.

26. A steel refining furnace having an interior lining comprised of a refractory brick, said furnace having an external shell to shield the cold face of said brick from oxygen penetration, said brick being comprised of a refractory material, a metal element as a part of the brick in use and extending from adjacent the hot face of the brick to adjacent the cold face of the brick, said refractory material being non-oxidizing to the metal element, and an additional material in said brick in sufficient quantity to prevent oxidation of the said metal element by oxygen within the brick and by oxygen that penetrates into the brick from the hot face thereof, said additional material comprising residual carbon in the amount of at least 3½%, the said residual carbon being provided by incorporating in the said refractory material a material selected from a class comprised essentially of pitch, carbon and graphite, said pitch when used not exceeding about 5%.

27. The furnace of claim 26 in which said furnace is a basic oxygen furnace.

28. The furnace of claim 26 in which the said residual carbon in the said brick is present in the amount of 3½% to 5½%.

* * * * *